S. Z. Hall.
Cotton Gin.

N° 87,771.    Patented Mar. 16, 1869.

Witnesses.
W^m Dennis
Florence Jewett

Inventor
Samuel Z. Hall.
by his Atty
J. Dennis Jr.

SAMUEL Z. HALL, OF SING SING, NEW YORK.

Letters Patent No. 87,771, dated March 16, 1869; antedated March 3, 1869.

IMPROVEMENT IN COTTON-GINS.

The Schedule referred to in these Letters Patent and making part of the same.

*To all whom it may concern:*

Be it known that I, SAMUEL Z. HALL, of Sing Sing, Westchester county, State of New York, have invented certain new and useful Improvements in Cotton-Gins; and I do hereby declare the following description and accompanying drawings are sufficient to enable any person skilled in the art or science to which it most nearly appertains, to make and use my said invention or improvements without further invention or experiment.

The nature of my invention and improvements consists in hollowing out or grooving the tops or fronts of cotton-gin ribs, lengthwise, at and for some distance each way from the point where the saws draw the lint through or between the ribs, so that the seed-cotton, lying in the grooves, will present the fibre nearer at right angles to the teeth of the saws than if there were no grooves in the ribs, enabling the saws to separate more of the lint from the seed than heretofore, and with greater facility.

Also, in making the end ribs about one-third as thick as the others, or shortening the breast, or feeding-box, so that the ends of the roll of seed-cotton may revolve in nearly a vertical line with the end saws. In the process of ginning, none of the seed-cotton enters between, but lies upon the peripheries of the saws, the teeth of which catch and carry the seed-cotton up and around, until it comes in contact with the ribs, when the fibre is stripped from it. The rotary motion of the saws also imparts a rotary motion to the seed when in contact with the ribs, and when sufficiently cleaned of the fibre by their action, fall down and pass out between the saws.

To insure good work, the roll of seed-cotton must be maintained in an even and unbroken line from end to end upon the peripheries of the saws. And to prevent the roll of unginned cotton from breaking at the ends, by the seed getting in or accumulating between the end saw and the side of the feeding-box, I arrange the side of the box so near the end saw that there will not be room, or space for the seed to enter or pass in between the end saw and the side of the box, which will preserve the ends of the roll of unginned cotton whole.

In the accompanying drawings—

In these drawings—

Figure 3:
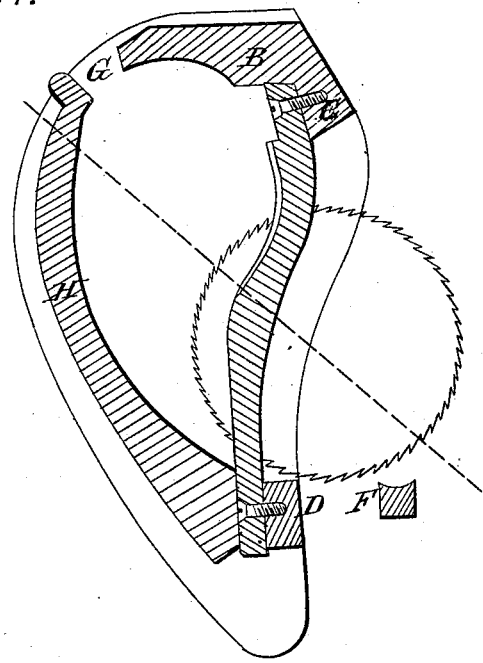
Figure 3 is a section on the line z z of fig. 1.

A A are the sides of the box,

B, the top,

C, the top bar, and

D, the bottom bar, connecting the two sides A A, and forming a frame to which the ribs F F are fastened, as shown in the drawing.

There is an opening, G, between the top and the front, H, into which the seed-cotton is fed to be ginned.

Figure 2:
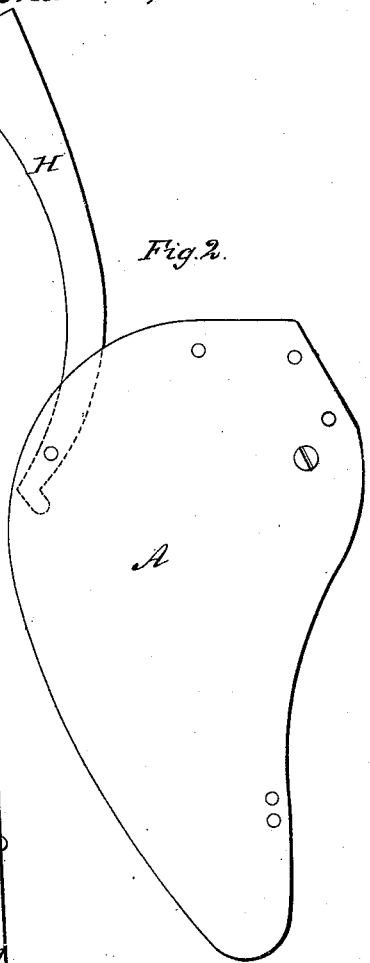
Figure 2 is a side elevation of the box.
Figure 1:
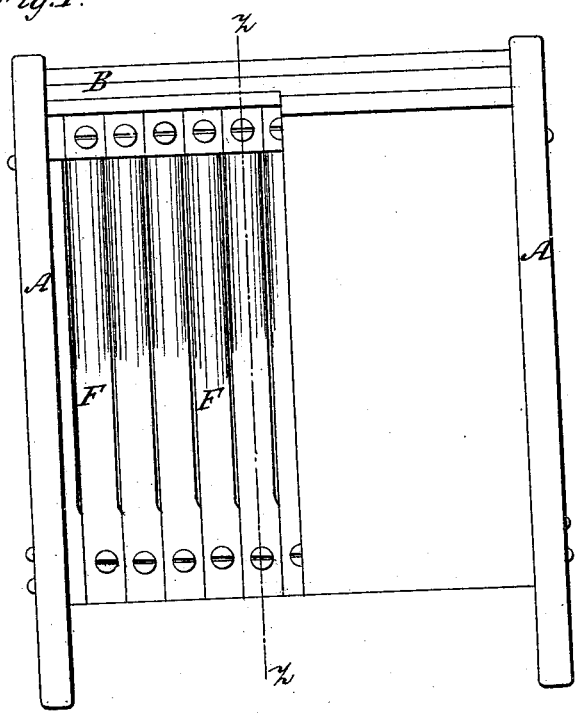
Figure 1 is a front elevation of a feed or roll-box of a cotton-gin, with my improvements, with one-half of the front removed to show the ribs.

The front, H, is pivoted to the sides A A, so that it may be turned up to the position shown in fig. 2, to expose the breast of the gin and let the roll of seed-cotton fall out when necessary to clean the saws or ribs.

The ribs of my gin are hollowed out, or grooved on the top or front, lengthwise, at and for some distance each way from the point where the saws draw the lint through, in the process of ginning, so that the seed-cotton may lie in the grooves of the ribs with the fibre extending across the spaces, or openings, at nearly right angles to the plane of the saws, which enables the teeth of the saws to strip the lint from the seed at or near its axial line. This improvement enables the teeth of the saws to more readily catch and separate the fibre from the seed than when the ribs are not grooved.

It is a decided advantage to groove the ribs of a cotton-gin, so that the axis of the seed lying in the grooves will be about even with the edge of the rib, so that the teeth of the saws can act more advantageously on the fibre projecting from the seed, and strip it more readily and effectually than if the centres or axes of the seeds were above the edge of the ribs.

At each side or end of the breast, I arrange the side or end, A, so near the end saw as not to leave room, or space wide enough for the cotton-seed to enter or accumulate between the saw and side of the box. This arrangement enables the end saws to turn the ends of the roll of seed, or unginned cotton, nearly in a vertical line with the plane of their motion, enabling the gin to do much more and better work, than when the space between the saw and the side of the box is wide enough for the ginned seed to enter. It also prevents the necessity of feeding heavier at the ends than in the middle to prevent the roll from breaking.

Having described my improvements,

What I desire to secure by Letters Patent, is—

1. Hollowing out, or grooving the tops or fronts of the ribs of a cotton-gin, substantially as described for the purposes set forth.

2. Making or arranging the sides of the box so near the end saws, that there will not be room for the seed to enter between the sides of the box and the end saws, substantially as described.

SAMUEL Z. HALL.

Witnesses:
JOHN W. SHEPARD,
CH. BLUMHARDT.